US012750406B2

(12) United States Patent
Verma et al.

(10) Patent No.: US 12,750,406 B2
(45) Date of Patent: Sep. 29, 2026

(54) REVERSE PATH FEEDBACK PROTOCOL FOR UNIDIRECTIONAL NETWORKS

(71) Applicant: International Business Machines Corporation, Armonk, NY (US)

(72) Inventors: Dinesh C. Verma, New Castle, NY (US); Mathews Thomas, Flower Mound, TX (US); Satishkumar Sadagopan, Leawood, KS (US); Gerald Coon, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 496 days.

(21) Appl. No.: 18/189,269

(22) Filed: Mar. 24, 2023

(65) Prior Publication Data

US 2024/0323230 A1 Sep. 26, 2024

(51) Int. Cl.
*H04L 9/40* (2022.01)

(52) U.S. Cl.
CPC .......... *H04L 63/20* (2013.01); *H04L 63/0428* (2013.01); *H04L 63/105* (2013.01)

(58) Field of Classification Search
CPC .... H04L 63/20; H04L 63/0428; H04L 63/105
USPC .............................................................. 726/1
See application file for complete search history.

(56) References Cited

U.S. PATENT DOCUMENTS

| | | | | |
|---|---|---|---|---|
| 5,703,562 | A | 12/1997 | Nilsen | |
| 5,790,753 | A * | 8/1998 | Krishnamoorthy | H04L 9/40 709/200 |
| 7,756,082 | B1 * | 7/2010 | Dhamdhere | H04W 36/0085 455/436 |
| 9,130,744 | B1 | 9/2015 | King | |
| 10,382,409 | B2 | 8/2019 | Mansour | |
| 10,650,376 | B1 * | 5/2020 | Winklevoss | G06Q 20/065 |
| 11,038,853 | B2 | 6/2021 | Mansour | |
| 11,153,345 | B1 * | 10/2021 | Lee | H04L 9/0643 |
| 11,349,898 | B2 * | 5/2022 | Ragot | H04L 69/24 |
| 11,553,022 | B2 * | 1/2023 | Ragot | H04L 1/0006 |
| 2002/0080719 | A1 * | 6/2002 | Parkvall | H04L 1/0001 370/252 |

(Continued)

FOREIGN PATENT DOCUMENTS

| | | | | |
|---|---|---|---|---|
| CN | 109218177 | A * | 1/2019 | H04L 45/745 |
| CN | 115347994 | A * | 11/2022 | H04W 28/0236 |

OTHER PUBLICATIONS

Disclosed Anonymously, "A Method of Receiver Oriented Multiple Communication Channel Switching", IP.com No. IPCOM000254040D, IP.com Electronic Publication Date: May 26, 2018, 4 pages.

Disclosed Anonymously, "Dynamic Encryption Communication Framework", IP.com No. IPCOM000269692D, IP.com Electronic Publication Date: May 4, 2022, 5 pages.

(Continued)

*Primary Examiner* — Aubrey H Wyszynski
(74) *Attorney, Agent, or Firm* — Steven M. Bouknight

(57) ABSTRACT

A method, computer program product and system are provided to provide control mechanisms in unidirectional data transfers. A processor connects to a secure device via a unidirectional connection. A processor sends a packet to the secure device via the unidirectional connection. A processor receives, from the secure device via a passive out-of-band channel, feedback regarding the transmission of the packet. A processor, in response to the feedback indicating that the packet was incorrectly received, resends the packet via the unidirectional connection with the secure device.

17 Claims, 4 Drawing Sheets

(56) References Cited

U.S. PATENT DOCUMENTS

| | | | | |
|---|---|---|---|---|
| 2012/0106413 | A1* | 5/2012 | Huang | H04L 69/22 370/310 |
| 2014/0189359 | A1* | 7/2014 | Marien | H04L 9/3228 713/172 |
| 2016/0234172 | A1* | 8/2016 | Agarwal | H04L 63/061 |
| 2018/0367243 | A1* | 12/2018 | Hsieh | H04W 72/04 |
| 2020/0252485 | A1* | 8/2020 | Vajravel | H04L 67/568 |
| 2021/0357914 | A1* | 11/2021 | Silvestri | H04L 9/0825 |
| 2022/0173894 | A1 | 6/2022 | Cain, Jr. | |
| 2023/0081816 | A1* | 3/2023 | Zhao | H04W 74/0808 370/329 |
| 2023/0300222 | A1* | 9/2023 | Kanamarlapudi | H04L 69/04 455/72 |
| 2023/0379349 | A1* | 11/2023 | Hamilton | H04L 63/1433 |
| 2025/0119414 | A1* | 4/2025 | Bate | H04L 63/08 |

OTHER PUBLICATIONS

Disclosed Anonymously, "Method for Communicating Signals Between People Using Spatiotemporally-limited Out-of-band Messaging", IP.com No. IPCOM000230165D, IP.com Electronic Publication Date: Aug. 23, 2013, 4 pages.

Geiger, Christopher, "Cyber Diode: Animated 2D Barcodes as a Mobile and Robust Data Diode", © 2018 IEEE, 4 pages.

Olivereau et al., "An Adaptive Method for Providing Content Integrity Protection", IP.com No. IPCOM000133801D, IP.com Electronic Publication Date: Feb. 9, 2006, Copyright: © Motorola, Inc Feb. 9, 2006, 12 pages.

Panabaker et al., "The Transmission of IP Over the Vertical Blanking Interval of a Television Signal", RFC 2728, IPVBI, Nov. 1999, 23 pages, <https://www.rfc-editor.org/rfc/rfc2728.html>.

Wikipedia, "Unidirectional network", accessed on Feb. 3, 2023, 5 pages, <https://en.wikipedia.org/wiki/Unidirectional_network>.

* cited by examiner

REVERSE PATH FEEDBACK PROTOCOL FOR UNIDIRECTIONAL NETWORKS

BACKGROUND OF THE INVENTION

The present invention relates generally to the field of data security, and more particularly to creating a reverse path of communication to a device that utilizes a unidirectional connection.

In many secure environments or locations, different machines are divided into different security levels. In some cases, a device at a lower security level can transmit information to a machine at the higher security level, but the machine at higher security level cannot transmit any data to the machine at lower security level. This results in a unidirectional communication network which can receive inbound communications but cannot respond. Such an approach means that the sender has no idea if the receiver has received the data and the receiver cannot let the sender know if there are any issues with the transmitted data (i.e., data or acknowledgements cannot be sent in reverse).

SUMMARY

Embodiments for the present invention provide for a method, computer program product and system to provide control mechanisms in unidirectional data transfers. A processor connects to a secure device via a unidirectional connection. A processor sends a packet to the secure device via the unidirectional connection. A processor receives, from the secure device via a passive out-of-band channel, feedback regarding the transmission of the packet. A processor, in response to the feedback indicating that the packet was incorrectly received, resends the packet via the unidirectional connection with the secure device.

DETAILED DESCRIPTION

Figure 1:
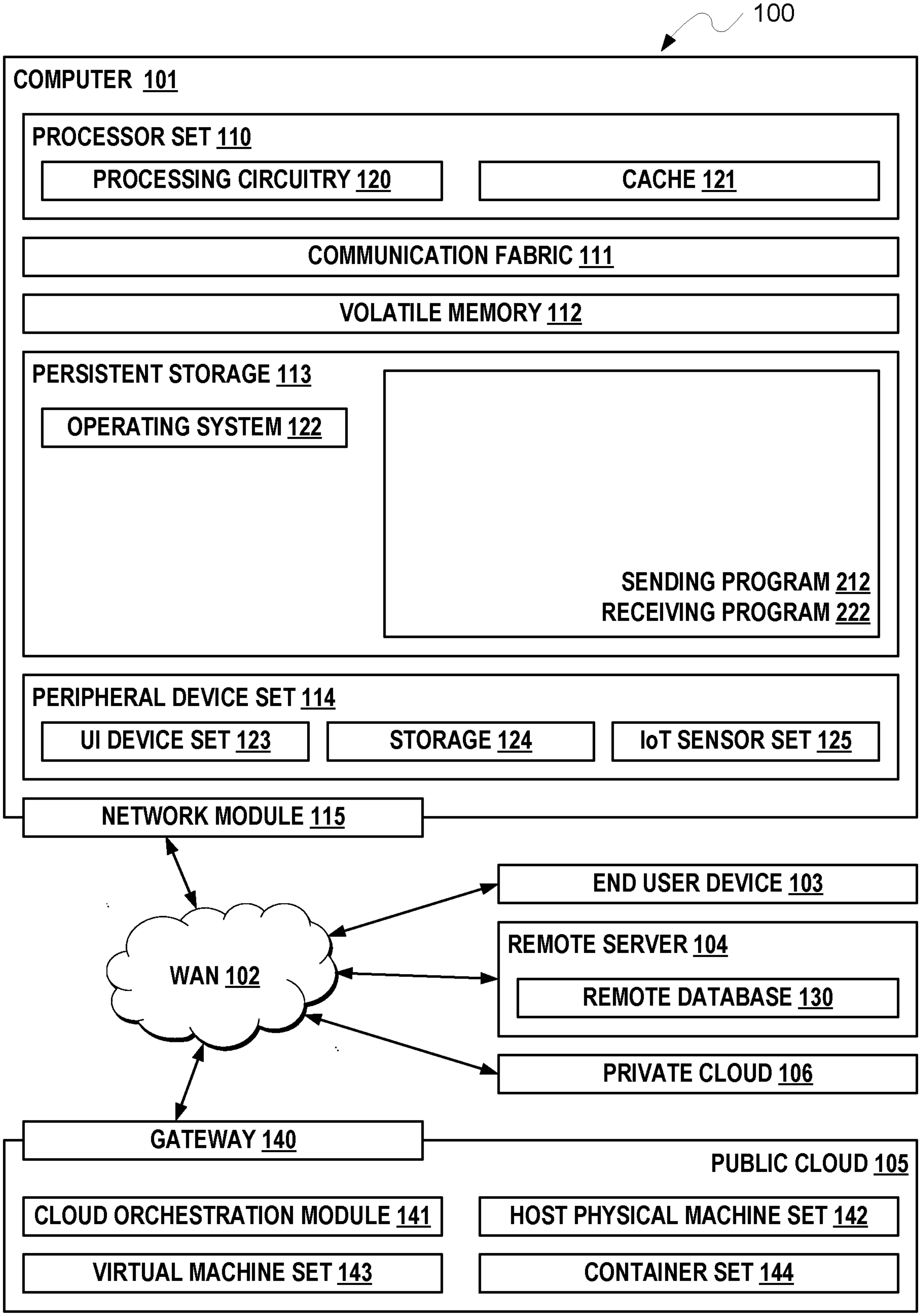
FIG. 1 depicts a block diagram of components of the computing device executing a reverse channel program, in accordance with an exemplary embodiment of the present invention.

Existing solutions to creating a reverse path in unidirectional networks typically include the use of a data diode which is an optical device that transmits information one way, but cannot transmit information the other way. Another option is the use of a one-way transmission protocol. Such protocols have been developed for transmission of data embedded in TV signals, or in other wide-area broadcast environments. However, these protocols are unidirectional and lack feedback for error correction during transmission. This can result in a significant overhead and inefficient data transfer.

Embodiments of the present invention leverage an alternative approach for providing a secure feedback channel. Typically, unidirectional networks in security application are performed while in close proximity. As such a receiving device that accepts data can provide, through another mechanism of the receiver device, a feedback indication. In some embodiments, the receiver provides visual feedback via a Quick Response (QR) code. This visual feedback serves as an “out-of-band” communication channel between the sender and receiver to provide a connection similar to Transmission Control Protocol (TCP). As will be discussed herein, embodiments of the present invention utilize a feedback mechanism, provided by the receiving device, to establish, out-of-band, a sequential connection-based delivery of data using the unidirectional network connection between the sender and receiver.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (“CPP embodiment” or “CPP”) is a term used in the present disclosure to describe any set of one, or more, storage media (also called “mediums”) collectively included in a set of one, or more, storage devices that collectively include machine readable code corresponding to instructions and/or data for performing computer operations specified in a given CPP claim. A “storage device” is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as sending program 212 and receiving program 222, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods (i.e., sending program 212 and receiving program 222) may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
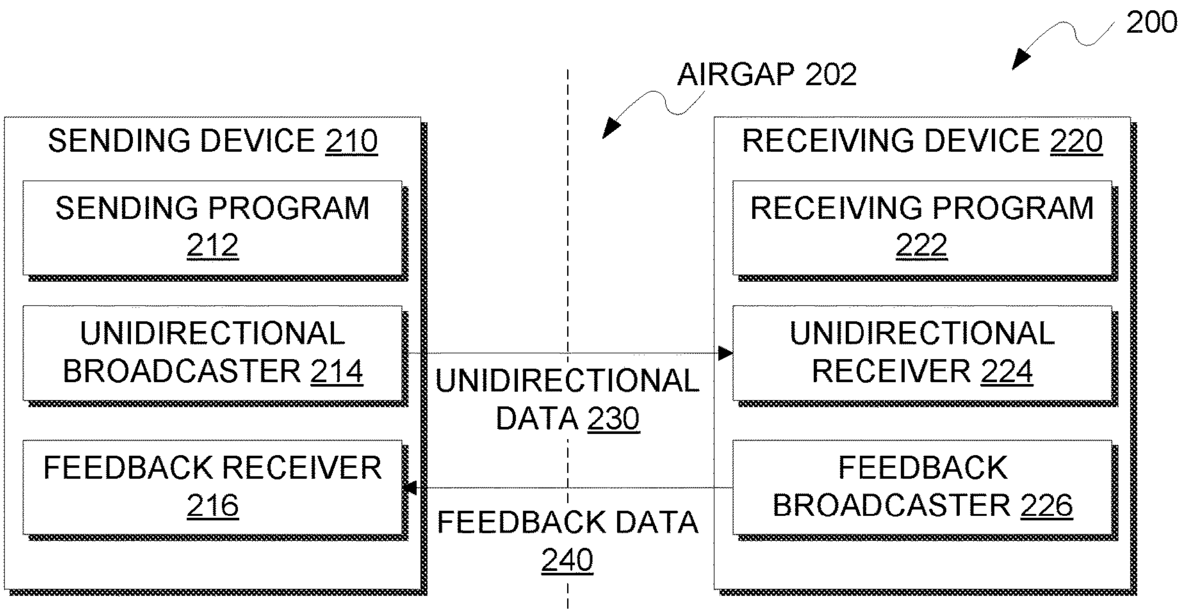
FIG. 2 is a functional block diagram illustrating a secure environment, in accordance with an exemplary embodiment of the present invention.

FIG. 2 is a functional block diagram illustrating secure environment, generally designated 200, in accordance with one embodiment of the present invention. Secure environment 200 includes sending device 210 and receiving device 220. Sending device 210 includes sending program 212, unidirectional broadcaster 214 and feedback receiver 216. Receiving device 220 includes receiving program 222, unidirectional receiver 224 and feedback broadcaster 226.

In various embodiments, sending device 210 and receiving device 220 are used to send data stored on sending device 210 to receiving device 220 for numerous applications and uses. In many security applications, security access is separated by a tiered system, where a device at a lower security tier can transmit information to a device at the higher security level, but the machine at higher security tier cannot transmit any data to the machine at lower security tier. In various embodiments, sending device 210 is a lower-tier security device and receiving device 220 is a higher-tier security device. One of ordinary skill in the art will appreciate that various additional security protocols and procedures may be deployed without deviating from the present invention. Additionally, to further enforce device security, sending device 210 and receiving device 220 are separated by airgap 202. Airgap 202 represents the lack of any direct data connection between sending device 210 and receiving device 220. In order to limit unwanted access to the higher-tiered security device (i.e., receiving device 220), airgap 202 is maintained such that no external network interfaces or devices can access or network with receiving device 220. While, in some embodiments, other devices on an internal network or of higher-tier may access or communicate via a network interface with either sending device 210 and receiving device 220, it should be understood that in various embodiments of the present invention sending device 210 has no network interfaces with, and is air-gapped from, receiving device 220.

To maintain the tiered access of devices, higher security devices, such as receiving device 220, only communicate with lower security devices, such as sending device 210, via unidirectional network connection, such as unidirectional data 230. As such, sending program 212 of sending device 210 can send data to receiving program 222 of receiving device 220 only via a unidirectional network broadcaster. In this arrangement, sending device 210 has a unidirectional broadcaster 214 that can only transmit information to receiving device 220. In turn, receiving device 220 includes unidirectional receiver 224 which receives the data broadcast from unidirectional broadcaster 214. In various applications and embodiments, unidirectional broadcaster 214 is a data diode that emit visible or non-visible light, which is collected by unidirectional receiver 224. Since light can travel in any medium, including an airgap, data diodes are commonly used as unidirectional network connections. One of ordinary skill in the art will appreciate that any communication schemes or devices that support unidirectional network transfers can be used with unidirectional broadcaster 214 and unidirectional receiver 224 without deviating from the invention.

In various embodiments, unidirectional data 230 is transferred via a passive connection. In this arrangement, receiving device 220 opens a port number open during data transfers. Typically, sending device 210 is pre-configured to access the port, whereas active connections permit the devices to resolve open ports. With airgap 202, active connections would violate most security arrangements, as active connections require bidirectional communications to resolve open port and sockets.

In various embodiments, unidirectional data 230 may fail to be delivered properly due to noise, improper alignment of diodes, or for a variety of other reasons. This typically results in the sending program 212 needing to resend the entire data payload given a high enough error rate. Also, since unidirectional data 230 can only transfer messages from the sending device 210 to receiving device 220, there exists no way for receiving program 222 to programmatically communicate that a transfer has failed. Typically, a display device connected to receiving device 220 would display an error message, requesting a re-send.

Embodiments of the present invention provide for a new and novel solution that maintains an airgap while providing a secure back channel to broadcast network control information. Feedback broadcaster 226 is a passive feedback mechanism that provides network control messages to sending device 210 to account for errors and other issues that may occur during a broadcast of unidirectional data 230. For example, embodiments of the present invention provide for a connection-based data transmission control that tracks data packet sending and acknowledgement, similar to that of Transmission Control Protocol (TCP).

In various embodiments, feedback broadcaster 226 passively transmits data transfer control messages as feedback data 240 to feedback receiver 216. Much like the transmission of unidirectional data 230, to maintain airgap 202 no active network interfaces can be made between sending device 210 and receiving device 220. As such, feedback broadcaster 226 must passively transmit control messages via feedback data 240 to maintain airgap 202.

In some embodiments, feedback broadcaster 226 is a display to renders a quick response (QR) code. QR codes are two-dimensional arrangement of patterns that encode, visually, data. The QR code can then be read by any device with vision of the QR code. As discussed herein, receiving program 222, encodes various network control messages to be passively transmitted to sending program 212 regarding status and of the transfer of unidirectional data 230. For example, the QR code could be generated to encode a re-transmission of a sequenced data packet, with the sequence number of the packets that was lost. In this arrangement, sending device 210 has a camera to be pointed at the display of receiving device 220, which passively displays feedback data 240 as a QR code. Receiving device 220 converts the QR code of feedback data 240 and handle any control messages displayed. By optically display and converting feedback data 240 via a QR code, embodiments of the present invention maintain airgap 202 as the visual display of data is passive. Additionally, encoding and encryption may be applied to ensure data security to QR code and feedback data 240. One of ordinary skill in the art will appreciate that other passive communication devices and mediums may be used without deviation from the present invention. In some embodiments, feedback broadcaster 226 may include unidirectional network connections that could be employed as unidirectional broadcaster 214, as well. Types of unidirectional broadcasters can include, but are not limited to, one or more of the following: data diodes (as discussed herein regarding unidirectional data 230), modified fiber optics with no return path, audible or inaudible sound via speakers or other transducers, or any other passive communication method. For each type of feedback, receiving program 222 encodes control messages (e.g., creating a QR image, determining a pulse keying scheme for diodes, or modulating a soundwave) to be decoded by sending program 212.

In some embodiments, visual communication from feedback broadcaster 226 is achieved via a display that renders a bar code. A barcode is a method of representing data in a visual, machine-readable form. Barcodes can be represented in either linear or matrix. Linear barcodes represent data by varying the widths, spacings and sizes of parallel lines. Matrix barcodes use rectangles, dots, hexagons and other patterns to represent numbers. Linear barcodes are also called 1-dimensional barcodes and matrix barcodes are called 2-dimensional barcodes. In some embodiments, other visual means of representing information using different colors, patterns, shapes and sizes can be used.

One of ordinary skill in the art will appreciate that many applications and benefits of transmission control can be achieved by the present invention, while still maintaining airgap 202. Various control mechanisms for data transfer can be achieved by the present invention including, but not limited to, error detection and correction, flow control and congestion control, while still maintaining airgap 202, such that the higher tiered security device (i.e., receiving device 220 does not have any network interfaces with sending device 210.

Regarding error detection and correction, feedback broadcaster 226 facilities a sequence-acknowledgement control of the unidirectional data 230 transfer. For example, sending program 212 receives a file to transfer to receiving program 222. Sending program 212 separates the file into various data packets and each packet is assigned a sequence number. Sending program sends each packet in the sequence, proving the sequence number with each packet. After a packet is transmitted, receiving program 222 evaluates the received packet for possible errors, where each packet is encoded with an error detection scheme, such as a parity bit. If the packet was received correctly, then receiving program 222 acknowledges the sequence number by passively relaying a control message via feedback broadcaster 226. If the packet has an error, then a re-send control message is passively relayed via feedback broadcaster 226.

Regarding flow control, receiving device 220 may have a limited amount of storage and memory. In scenarios were receiving device 220 lacks computing resources, feedback data 240 can convey flow control messages to sending device 210. Flow control messages indicate the buffer size of a device or the amount of data that can be sent before an acknowledgement can be sent. This limits the overall throughput of the system. However, some devices may lack system memory or processing capabilities to process higher data rates. Feedback control messages can help tuned data transfer rates for optimal transfer while minimize error rates and re-sends.

Regarding congestion control, due to passive data transfer of unidirectional data 230, timeouts, collisions with other signals and lost connections may occur. Receiving device 220, based on network conditions, may passively send congestion control messages to sending device 210. Unlike flow control, which occurs by a receiving device being overwhelmed, congestion occurs if packets are sent to frequently in a network causing packets to "collide" and be not received. Based on a lag or delay in acknowledgement of packets, congestion control messages are sent via receiving device 220 to determine a packet data rate to decrease the delay of acknowledgement by receiving device 220.

In various embodiments, feedback broadcaster 226 also can be used to establish a connection between sending device 210 and receiving device 220. As discussed herein, passive data connections typically require an open port that receiving device 220 monitors. Leaving a port constantly open is not a secure arrangement and as discussed herein, with no return path caused by airgap 202, open ports cannot be conveyed. Feedback broadcaster 226 can provide such information to receiving program 212 so that the transfer of unidirectional data 230 can be established.

One of ordinary skill in the art will appreciate that many modifications of the approaches for implementing flow control, congestion control and connection establishment can be made using the approach defined in this disclosure. In addition to the implementation of the transmission control protocol, the visual feedback mechanism can be used to implement other protocols used commonly in computer communications. Examples of these protocol include the Session Initiation Protocol (SIP), Real-time Transport Protocol (RTP), Transport Layer Security (TLS), HyperText Transfer Protocol (HTTP), File Transfer Protocol (FTP) and many others.

Figure 3:
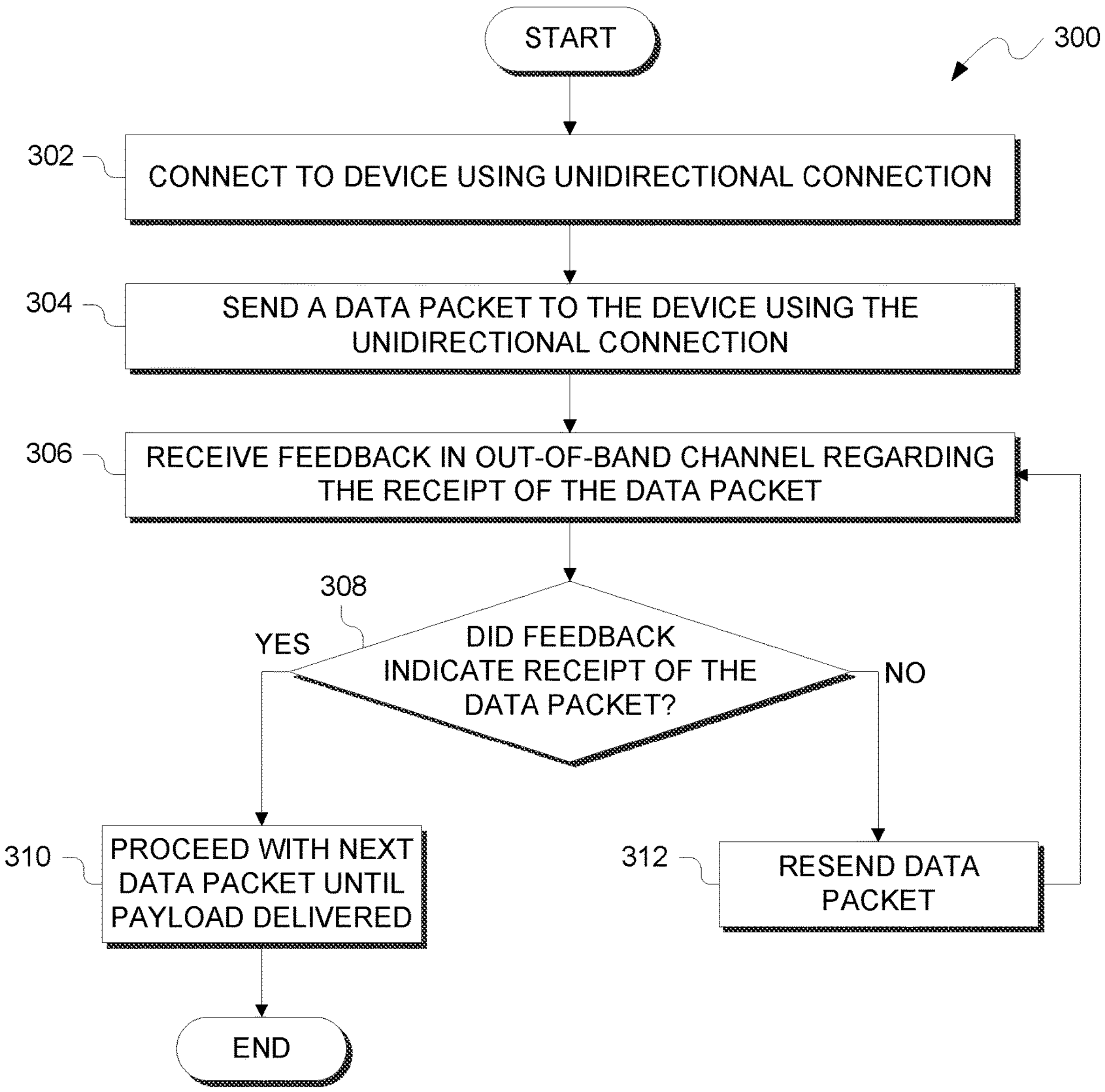
FIG. 3 illustrates operational processes of sending program, on a computing device within the environment of FIG. 1, in accordance with an exemplary embodiment of the present invention.

FIG. 3 illustrates operational processes, generally designated as 300, of sending program 212. In process 302, sending program 212 of sending device 210 connects to receiving program 222 of receiving device 220. In some scenarios, unidirectional broadcaster 214 is preconfigured to communicate with unidirectional receiver 224. For example, in scenarios where data diodes are used for unidirectional broadcaster 214 and unidirectional receiver 224, the encoding scheme and other network/connection configurations are preconfigured in both devices. In other scenarios, unidirectional broadcaster 214 may need to be configured or otherwise altered in operation to connect or communicate with unidirectional receiver 224. In such scenarios, feedback broadcaster 226 can be used to relay the configuration data to sending program 212 via feedback receiver 216. For example, feedback broadcaster 226 could display a QR code that encodes the configuration data needed to connect via unidirectional receiver 224.

In process 304, once the connection is established, sending program 212 starts transferring data as packets to receiving program 222. In various scenarios, sending program 212 has access to a file, or group of files, that is to be uploaded to receiving program 222. As discussed herein, the files to be transferred are a payload. The file or files, or payload, is broken into various chunks or portions that are then divided into packets. Each packet is assigned a sequence number to provide a mechanism for transmission control over the unidirectional data 230 transfer. As discussed herein and in more detail in FIG. 4, receiving program 222 uses the sequence numbers to track receipt of unidirectional data 230 and to provide error detection and other control over the data transfer.

In process 306, sending program 212 receives feedback in an out-of-band channel regarding receipt of the packet sent in process 304 to receiving program 222. As utilized herein, out-of-band channel refers to the use of another communication channel and not the same channel used to transfer unidirectional data 230 (i.e., feedback data 240 occurs in a out-of-band channel between feedback broadcaster 226 and feedback receiver 216, instead of using a channel within the transfer of unidirectional data 230 between unidirectional broadcaster 214 and unidirectional receiver 224).

In decision process 308, sending program 212 evaluates the feedback received in process 306. If the feedback indicates that the packet was received properly (YES branch of decision process 308), then sending program 212 proceed with the next packet until all packets for the payload are sent and acknowledged (process 310). If the feedback indicates that the packet was not received (NO branch of decision process 310), then sending program 212 will resend the packet that was not received properly (process 312).

By sending packets in sequence and acknowledging receipt, embodiments of the present invention can provide error detection and correction typical of connection based communications, such as those provided by TCP control protocols. However, due to the requirement of airgap 202, data cannot leave the higher-tier security receiving device 220. Passive feedback provided out-of-channel via feedback broadcaster 226 can provide control information, such as the receipt of data packets, to sending device 210. The control information can be used by sending program 212 to modify or otherwise change the delivery of unidirectional data 230 to improve data rates, data integrity and other aspects of the delivery of unidirectional data 230.

Figure 4:
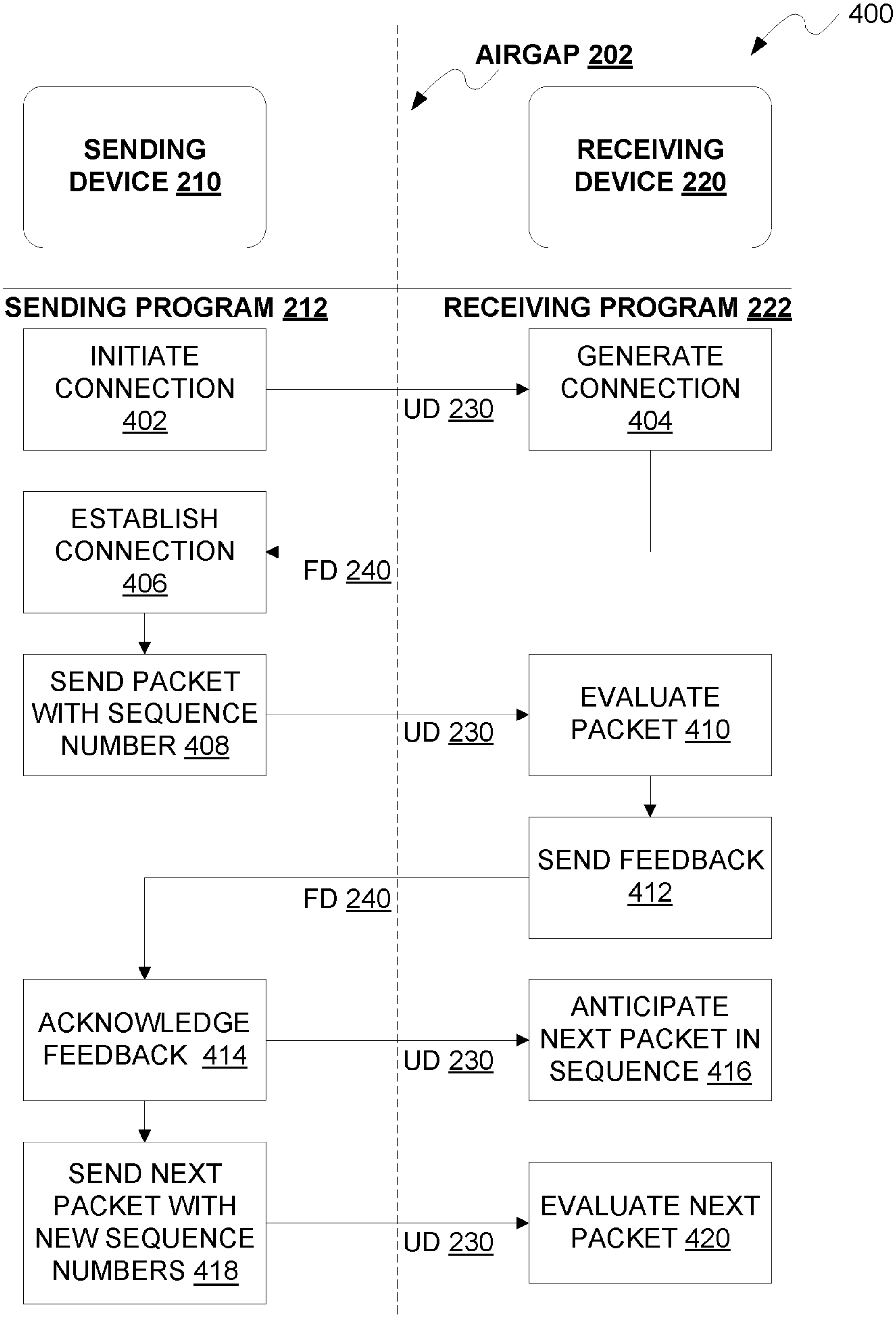
FIG. 4 illustrates a process flow of a establishing a reverse channel path, on a computing device within the environment of FIG. 1, in accordance with an exemplary embodiment of the present invention.

FIG. 4 illustrates a process flow, generally designated 400, of a establishing a reverse channel path between sending device 210 and receiving device 220. FIG. 4 depicts various processes 402-420 that are divided via airgap 202 and attributed to the respective device and program which perform such processes (i.e., sending program 212 performs processes 402, 406, 408, 414, & 418 and receiving program 222 performs processes 404, 410, 412, 416, and 420). Additionally, each connection between processes that crosses airgap 202 indicates which type of data transfer channel is used (i.e., UD 230 uses unidirectional data 230 and FD 240 uses feedback data 240).

In process 402, sending program 212 initiates a connection with receiving program 222. In some scenarios, sending device 210 may be pre-configured to connect to receiving device via unidirectional data 230. If sending device 210 is pre-configured, then the connection to receiving device 220 is established (process 406). In other scenarios, sending device 210 needs to be configured to connect to receiving device 220. As discussed herein, unidirectional networks typically leave a port open for connections. Since handshaking is not possible due to airgap 202 and no reverse channel, conveying the open port number is not possible and is typically handled by pre-configuring the devices. Due to the passive and out-of-band feedback data 240, this information can be conveyed to a user without sacrificing airgap 202.

In process 404, receiving program 222 generates the configuration details for the connection, then receiving program 222 passively transmits the information via feedback broadcaster 226. For example, receiving program 222 encodes the configuration details into a QR code that is displayed via feedback broadcaster 226, which in turn is captured by a camera feedback receiver of sending device 210. Various configurations and changes can be made to unidirectional data 230 connection. Example configurations include, but are not limited to, channel/band, encoding schemes, encryption schemes, data rates and the like. Once the connection is configured, sending device 210 connects to receiving device for a transfer of unidirectional data 230 (process 406).

As discussed herein, sending program 212 is connecting to receiving program 222 to transfer a file to receiving device 220. The file is referred to as a payload and is broken into packets of a pre-determined size. Once the payload is separated into packets, sending program 212 assigns a sequence number to each packet. In process 408, sending program 212 sends a packet, as unidirectional data 230, with a sequence number to receiving program 222. Upon receipt, receiving program 222 evaluates the packet. In various scenarios, each packet has an error detection scheme encoded in the packet. Error detection schemes are encoding methods that detect if an error has occurred during transport of data. For example, a parity bit could be added to the packet to detect errors. Other error detection schemes that may be used include, but are not limited to, checksums, cyclic redundancy checks or hash functions.

Based on the evaluation in process 410, receiving program 222 send feedback (process 412) as feedback data 240. The feedback indicates or acknowledges the proper receipt of the packet. If the error detection scheme of the packet indicates that the packet was received with no errors, then sending program 212 acknowledges receipt (process 414) by sending an acknowledgement message via unidirectional data 230. After receipt of this acknowledgement message, receiving program 222 anticipates the next sequence number for the following packet (process 416). By acknowledging and anticipating the next packet, both sending program 212 and receiving program 222 can coordinate the next packet transfer. If a packet was never received by the receiving device 220, neither would be aware of the missing packet unless the acknowledgement is made.

If the error detection scheme of the packet indicates that the packet has errors, then receiving program 222 generates passive feedback via feedback broadcaster 226 that the packet had an error and needs to be retransmitted (process 412), indicating the packet's sequence number that had the error. In process 414, acknowledges the error and resends the packet with the indicated sequence number. Once the packet is sent and acknowledged for properly received packets or re-sent then subsequently acknowledged, then sending program 212 sends the next packet, as unidirectional data 230, with the next sequence number (process 418). In process 420, receiving program 222 evaluates the next packets in the same manner discussed in process 410. Both sending program 212 and receiving program 222 repeat processes 412 to 420 until the entire file is received by receiving program 222.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:

a secure device having both a unidirectional connection and a passive out-of-band channel, wherein the secure device is air-gapped from connecting devices;

sending a packet to the secure device via the unidirectional connection;

receiving, from the secure device via the passive out-of-band channel, feedback regarding transmission of the packet; and in response to the feedback indicating that the packet was incorrectly received, resending the packet via the unidirectional connection with the secure device.

2. The computer-implemented method of claim 1, wherein the unidirectional connection is configured based on passive output received from the secure device in the passive out-of-band channel.

3. The computer-implemented method of claim 1, wherein the feedback indicates changes to flow control or congestion control of the unidirectional connection.

4. The computer-implemented method of claim 1, wherein the unidirectional connection is established via one or more of the following: one or more data diodes, modified fiber optics with no return path, or audio transducers.

5. The computer-implemented method of claim 1, wherein the passive out-of-band channel is established via an encoding and a decoding of a Quick Response (QR) code.

6. The computer-implemented method of claim 1, wherein the feedback indicates error detection of the received packet.

7. A computer program product comprising:

a secure device having both a unidirectional connection and a passive out-of-band channel, wherein the secure device is air-gapped from connecting devices;

one or more computer-readable storage media and program instructions stored on the one or more computer-readable storage media, the program instructions comprising:

program instructions to send a packet to the secure device via the unidirectional connection;

program instructions to receive, from the secure device via the passive out-of-band channel, feedback regarding transmission of the packet; and program instructions, in response to the feedback indicating that the packet was incorrectly received, to resend the packet via the unidirectional connection with the secure device.

8. The computer program product of claim 7, wherein the unidirectional connection is configured based on passive output received from the secure device in the passive out-of-band channel.

9. The computer program product of claim 7, wherein the feedback indicates changes to flow control or congestion control of the unidirectional connection.

10. The computer program product of claim 7, wherein the unidirectional connection is established via one or more of the following: one or more data diodes, modified fiber optics with no return path, or audio transducers.

11. The computer program product of claim 7, wherein the passive out-of-band channel is established via an encoding and a decoding of a Quick Response (QR) code.

12. The computer program product of claim 7, wherein the feedback indicates error detection of the received packet.

13. A computer system comprising:

a secure device having both a unidirectional connection and a passive out-of-band channel, wherein the secure device is air-gapped from connecting devices;

one or more computer processors;

one or more computer readable storage media; and program instructions stored on the one or more computer readable storage media for execution by at least one of the one or more computer processors, the program instructions comprising:

program instructions to send a packet to the secure device via the unidirectional connection;

program instructions to receive, from the secure device via the passive out-of-band channel, feedback regarding transmission of the packet; and program instructions, in response to the feedback indicating that the packet was incorrectly received, to resend the packet via the unidirectional connection with the secure device.

14. The computer system of claim 13, wherein the unidirectional connection is configured based on passive output received from the secure device in the passive out-of-band channel.

15. The computer system of claim 13, wherein the feedback indicates changes to flow control or congestion control of the unidirectional connection.

16. The computer system of claim 13, wherein the unidirectional connection is established via one or more of the following: one or more data diodes, modified fiber optics with no return path, or audio transducers.

17. The computer system of claim 13, wherein the passive out-of-band channel is established via an encoding and a decoding of a Quick Response (QR) code.

* * * * *